March 24, 1970    V. P. POLISCHUK ET AL    3,502,781

CHANNEL-TYPE INDUCTION FURNACE

Filed Dec. 27, 1968      3 Sheets-Sheet 2

United States Patent Office
3,502,781
Patented Mar. 24, 1970

3,502,781
CHANNEL-TYPE INDUCTION FURNACE
Vitaly Petrovich Polischuk, Ulitsa M. Gorkogo 170/172, kv. 36, and Mark Rakhmilievich Tsin, Ulitsa Bolshaya Podvalnaya, 19, kv. 57, both of Kiev, U.S.S.R.
Filed Dec. 27, 1968, Ser. No. 787,405
Int. Cl. H05b 5/00, 5/12
U.S. Cl. 13—29          1 Claim

ABSTRACT OF THE DISCLOSURE

A channel-type induction furnace, in which the bath of molten metal communicates with at least three channels, intersecting each other, one channel having a removable conduit for molten metal discharge, the point of intersection of the channels being environed by an additional magnetic conductor with windings for inducing a magnetic field interacting with the current flowing through the intersection of the channels to move molten metal at a controllable speed.

---

The present invention relates to metallurgy and foundry practice, and more specifically it relates to channel-type induction furnaces for preparing preheating, mixing and storing molten metal with the subsequent delivery of it to consumers, for example, ladles or foundry moulds.

Known in the prior art are channel-type induction furnaces, in which the bath of molten metal is connected with at least three channels intersecting each other, one of these channels being coupled to a removable conduit for transferring metal during its discharge from the furnace.

The existing channel-type induction furnaces are disadvantageous in that the movement of metal in the channels thereof is only effected due to convection and electrodynamic forces during the interaction of electric current within the mass of molten metal with its proper magnetic field, i.e. this movement of the metal is a result of a thermal action of the current flowing through the furnace channel.

The systems based on the effect of interaction of the current flowing through the channel with the proper magnetic field for transferring the molten metal from the furnace channel to the discharge conduit do not ensure pressures necessary for some manufacturing processes at practically permissible currents flowing through the channels.

Furthermore, any increase in the current flowing through molten metal during the pouring process results in mixing the metal in the outlets of the lateral channels and its overheating which is often undesirable.

The specific object of the invention is to provide a channel-type induction furnace, in which the directed transfer of molten metal in the furnace channels with a view to removing it from these channels, intermixing of the bath and controlled delivery of molten metal into receivers is effected regardless of the magnitude current flowing through the molten metal in the furnace channels, and, hence, regardless of the conditions of preheating the molten metal.

According to these and other objects, the essence of the invention consists in that in the induction channel-type furnace, in which the bath of molten metal communicates with channels at least with three of them, intersecting each other, one of these channels being connected to a removable conduct during the period of discharging molten metal from the furnace, according to the invention, the point of intersection of the channels is environed by an additional magnetic conductor provided with windings for inducing a controlled magnetic field interacting with the current flowing through the above point of intersection of the channels so as to move molten metal in the given direction at a controllable speed.

Other objects and advantages of the present invention will become more fully apparent from a consideration of the following description of exemplary embodiments thereof, taken in conjunction with the accompanying drawings, in which.

Figure 1:
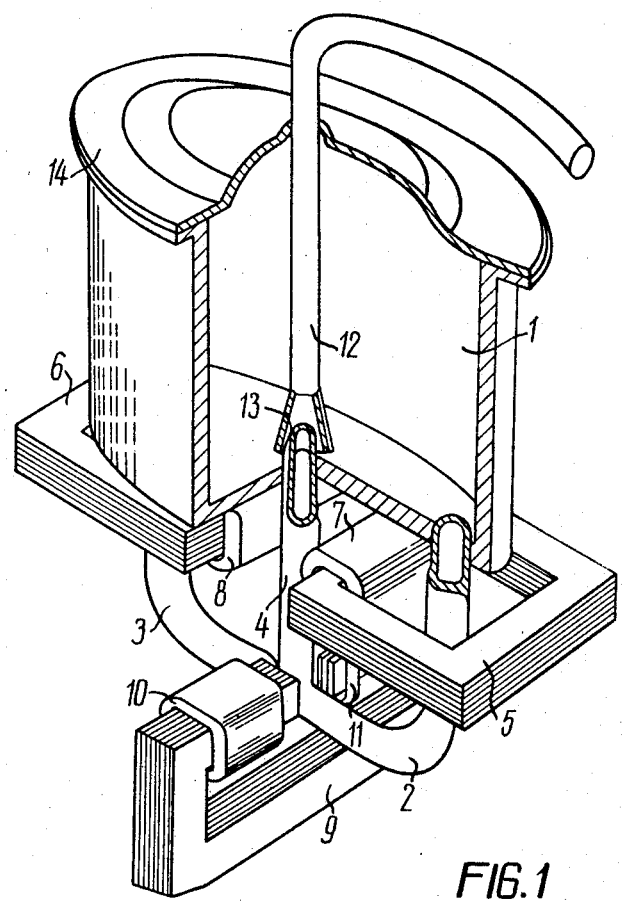
FIG. 1 is a general view of the channel-type induction furnace according to the invention.

The induction furnace whose schematic diagram is shown in FIG. 1 is composed of a bath 1, channels 2, 3, 4, closed circuit magnetic conductors 5 and 6 with A.C. windings 7 and 8 which induce an electric current within the mass of molten metal filling the channels 2, 3 and 4, as additional open-circuit magnetic conductor 9 with windings 10, 11 which produce an external magnetic field in the center of intersection of the channels 2, 3 and 4. The discharge conduit 12 is connected to the channel 4 through an adapter 13. The furnace is closed with a cover 14. The section of the channel within the gap of the open-circuit magnetic conductor is preferably narrowed for reducing the value of the interpole gap.

In the proposed machine the molten metal is transferred according to three basic operating duties.

Figure 2A:
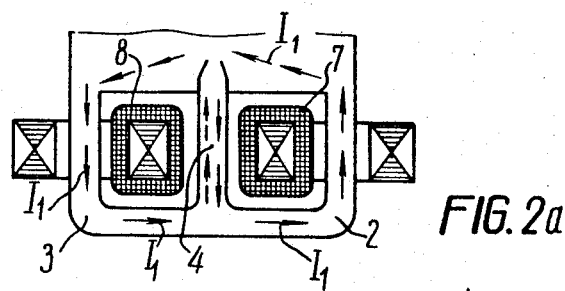
FIG. 2a shows distribution of the current according to the first operating duty of the furnace.
Figures 2B, 2C:
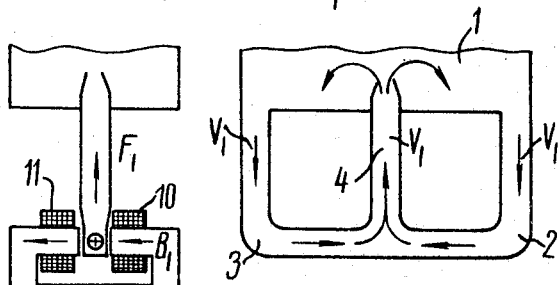
FIG. 2b shows interaction of the current and magnetic flux in the point of intersection of the channels according to the first operating duty.
FIG. 2c shows the direction of movement of the metal within the channels according to the first operating duty.

In the first duty the machine operates as follows:

The windings 7, 8 are connected to the same phase of the power network. In this case the current in the channel 4 is equal to a sum of the currents induced in the channels 2 and 3, respectively, and this sum is equal to zero, i.e. the current $I_1$ (FIG. 2a) actually flows only through the channels 2 and 3 passing the point of connection of the channels in the direction which is perpendicular to the longitudinal axis of the channel 4. The windings 10 and 11 (FIG. 2b) are connected in series so that the produced magnetic fluxes $B_1$ are summarized and the total magnetic flow within the gap coincides in phase with current $I_1$ flowing through molten metal.

Interaction of magneticflux with the current flowing through the molten metal produces an electrodynamic force $F_1$. Under the effect of this force, the molten metal moves at a speed $V_1$ (FIG. 2c) along the channel 4 towards the bath 1 (FIG. 1). The rate of circulation of metal under otherwise equal conditions depends on the voltage applied to the windings 10 and 11 and this voltage can be easily varied within a wide range.

At low speeds of the molten metal motion corresponding to a low voltage applied to the windings 10 and 11, the metal calmly flows through the channels 2 and 3 to the channel 4 and therefrom into the bath 1 so that the overheated metal is removed from the channels, and its speed may be defined by a predetermined superheating value of the molten metal in the channels as compared with the metal temperature in the furnace bath.

In order to speed up the process of melting down metal in the bath (for example), when using a solid charge or to mix it to provide a higher uniformity before the pouring operating the windings 10, 11 are supplied with a higher voltage, therefore, the molten metal flow speed in the channel 4 is increased and the metal is forced as it were fountain into the bath thereby providing for good mixing.

To carry out supply of the molten metal from the furnace into the receiver (not shown in the drawing) the channel 4 is connected to the discharge conduit 12, thereafter the windings 10 and 11 are energized. Under the action of the force $F_1$, (FIG. 2b) the molten metal is fed through the conduit 12 (FIG. 1) to the consumer.

The pressure being set up is controlled by varying the supply voltage applied to the electromagnet, for example, by means of a transformer or a magnetic amplifier. When necessary, the pressure can be controlled by varying current flowing through molten metal and shifting the phase angle between the current in the molten metal and the magnetic flux.

The metal flow is stopped by switching off the windings 10, 11 or by reversing them, thereby sharply cutting off the stream of molten metal.

The molten metal can be fed from the furnace into the molds either by gravity (by connecting the conduit 12 with the nozzle of the mould 1) or under an excessive pressure similar to a casting process carried out under a flow gas pressure (in this case, the conduit 12 is rigidly connected to the mould for bottom or lateral pouring of metal).

Figure 3A:
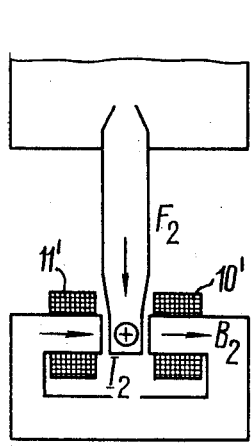
FIG. 3a shows interaction of the current and magnetic flux in the point of intersection according to the second operating duty.
Figure 3B:
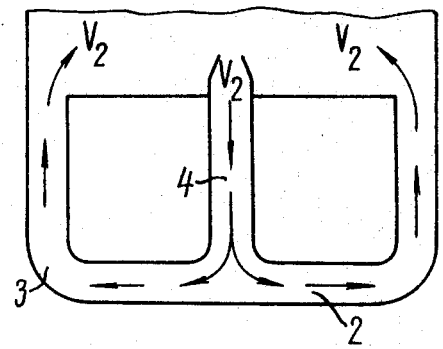
FIG. 3b shows the direction of movement of the metal in the channel according to the second operating duty.

According to the second duty the windings $10^1$, $11^1$ (FIG. 3a) producing the magnetic field $B_2$ are energized at a phase shift of 180° as compared with the first duty. This results in reversing the direction of the electromagnetic force $F_2$ and the molten metal is pumped from the bath through the central channel and fed back into the bath through the lateral channels at a speed $V_2$ (FIG. 3b).

This duty is employed, for example, for mixing the molten metal in the furnace with liquid and solid additions whose specific weight is lower than that of the molten metal which poorly interacts with these additions. The metal flowing downwards through the channel 4 carries these additions away through the adapter 13 (FIG. 1) into the channel. On passing through the latter, the additions effectively interact with the molten metal thus facilitating the assimilation thereof by the metal.

Figure 4A:
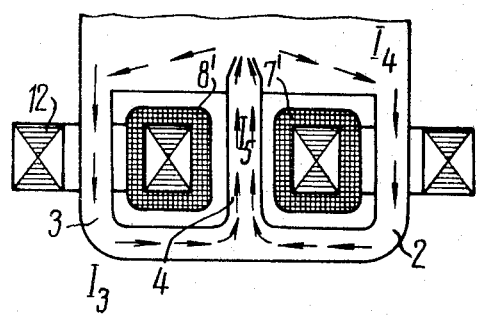
FIG. 4a shows distribution of the currents in the furnace channels according to the third operating duty.
Figure 4B:
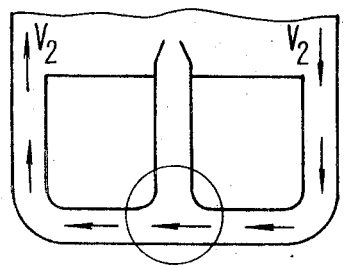
FIG. 4b shows the direction of movement of the metal according to the third operating duty.
Figure 4C:
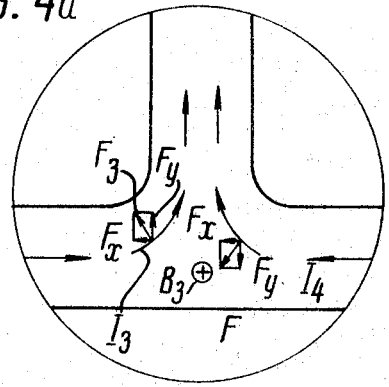
FIG. 4c shows distribution of the currents, the magnetic flux and electromagnetic forces in the node of intersection of the channels according to the third operating duty.

According to the third operating duty of the furnace one of the windings $7^1$ (FIG. 4a) of the magnetic conductor 5 or one of the windings 8 of the magnetic conductor 6 is switched over to the opposite phase.

In the center of intersection of the channels 2, 3 and 4 the currents $J_3$ (FIG. 4a) and $J_4$ flow at a certain angle to the axis of the channel 4. Owing to the interaction of these currents $J_3$ and $J_4$ with the magnetic flux $B_3$ there is formed a component $F_x$ of the electromagnetic force $F_3$, normal to the axis of the channel 4. Under the action of this force the molten metal is pumped from the bath through the channel 2 into the channel 3 and therefrom back unto the bath. Circulation of the metal in the channel 4 is effected in a regular manner.

This operating duty of the furnace may be used for side mixing of the metal, in particular, in a case when a discharge conduit 12 is provided.

Application of the proposed channel furnace provides for the following advantageous facilities:

(a) The process of melting down metal is speeded up, especially in case of using a charge consisting of large pieces;

(b) Superheating of the molten metal in the channel is controlled within a predetermined range depending on the process conditions and regardless of the current density in the metal;

(c) Provision of a uniform chemical composition and temperature within the entire volume of the bath;

(d) Provision of a controlled mixing of the molten metal in the bath; the rate of mixing does not depend on the current flowing through the molten metal, therefore, on the conditions of heating;

(e) The pouring process is effected through a closed metal conduit, the molten metal is discharged from the bottom portion of the bath and this provides for maintaining the quality and puring of metal which have been attained in the furnace;

(f) Inertia-free control of current in the windings ensures maintaining the necessary process conditions for pouring metal into the moulds and an accurate batching the rate of pouring does not depend on the metal temperature at a given moment;

(h) The furnace design makes it possible to meltdown treat and pour molten metal under a protective atmosphere and in vacuum;

(i) The furnace design makes it possible to feed molten metal into a mould under a high pressure set up by electromagnetic forces;

(k) Experiments have shown that a directed transfer of molten metal through the furnace channels contributes to a reduction in contamination of the channels by oxides, sludge, etc. Therefore, a scheduled period of operation of the furnace, for example, to be used for melting down aluminium alloys without repairs, is prolonged.

It will be understood by those skilled in the art that the invention is not limited by the embodiment described thereabove, so that changes and modifications thereof may be allowed in the construction and arrangement of parts without departing from the scope and spirit of the invention.

These changes and modifications are considered to fall within the scope of the present invention as defined by the appended claim.

We claim:

1. A channel-type induction furnace comprising at least three channels intersecting each other; a bath of molten metal communicating with said channels; a removable conduit connected to one of said channels when pouring molten metal from the furnace through this channel; a closed-circuit magnetic conductor embracing one lateral channel of said channels; another closed-circuit magnetic conductor embracing another lateral channel of said channels, windings of said closed-circuit magetic conductors being connected to an alternating current network; an additional open-circuit magnetic conductor embracing the point of intersection of said channels, the windings of said magnetic conductor inducing a controlled magnetic field interacting with the current in said point of intersection of the channels for moving metal in a predetermined direction at a controlled speed.

References Cited

UNITED STATES PATENTS

| 2,286,024 | 6/1942 | Tama et al. | 13—26 |
| 2,539,215 | 1/1951 | Weil et al. | 13—26 |
| 2,539,800 | 1/1951 | Tama | 13—29 |
| 2,541,841 | 2/1951 | Tama | 13—29 |

HIRAM B. GILSON, Primary Examiner

U.S. Cl. X.R.

13—26